(12) United States Patent
Matousek et al.

(10) Patent No.: US 6,875,103 B2
(45) Date of Patent: Apr. 5, 2005

(54) APPARATUS AND METHOD FOR INSTALLING AND REMOVING A HARVESTING COMBINE ROTOR

(75) Inventors: Robert Matousek, Milan, IL (US); Mark Epperly, Sherrard, IL (US); Jon Ricketts, Viola, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/041,139

(22) Filed: Jan. 7, 2002

(65) Prior Publication Data

US 2003/0126847 A1 Jul. 10, 2003

(51) Int. Cl.[7] ................................................. A01F 7/00
(52) U.S. Cl. .............. 460/150; 296/190.04; 296/190.06
(58) Field of Search .......................... 460/66, 119, 150; 180/89.12, 89.13, 89.14, 89.15; 296/190.04, 190.05, 190.07, 190.06; 280/788

(56) References Cited

U.S. PATENT DOCUMENTS

| | | | | |
|---|---|---|---|---|
| 2,362,453 A | * | 11/1944 | Cosper | 180/89.15 |
| 2,939,541 A | * | 6/1960 | Smalley | 180/89.15 |
| 3,720,047 A | * | 3/1973 | van der Lely | 56/15.6 |
| 3,721,077 A | * | 3/1973 | Van Der Lely | 56/15.6 |
| 3,737,192 A | * | 6/1973 | Hirsch | 296/190.05 |
| 3,884,321 A | * | 5/1975 | Drake et al. | 180/89.13 |
| 4,018,473 A | * | 4/1977 | Chalupsky | 296/190.04 |
| 4,421,188 A | * | 12/1983 | Fredriksen | 180/327 |
| 4,427,090 A | * | 1/1984 | Fredriksen et al. | 180/327 |
| 4,440,437 A | * | 4/1984 | Hahm et al. | 296/190.05 |
| 5,029,436 A | * | 7/1991 | Fredriksen et al. | 56/14.5 |
| 6,206,422 B1 | * | 3/2001 | Goddard | 280/788 |

FOREIGN PATENT DOCUMENTS

| | | | | | |
|---|---|---|---|---|---|
| JP | 07236339 A | * | 9/1995 | | A01D/67/00 |
| JP | 09154376 A | * | 6/1997 | | A01D/67/00 |
| SU | 1572905 A | * | 6/1990 | | B62D/33/06 |

* cited by examiner

Primary Examiner—Árpád Fab Kovács
(74) Attorney, Agent, or Firm—Brant T. Maurer; Rebecca Henkel

(57) ABSTRACT

An apparatus for installing and removing a harvesting combine rotor includes a harvesting combine having a frame portion. A linkage assembly is operatively connected to the frame portion A cab is operatively connected to the linkage assembly to allow the cab to be raised to allow the installation and removal of a combine rotor.

11 Claims, 11 Drawing Sheets

APPARATUS AND METHOD FOR INSTALLING AND REMOVING A HARVESTING COMBINE ROTOR

FIELD OF THE INVENTION

This invention relates generally to the field of agricultural crop harvesters. It relates particularly to agricultural crop harvesters such as combines and, more specifically, to an apparatus and method for installing and removing a harvesting combine rotor.

BACKGROUND OF THE INVENTION

Modern harvesting combines are generally equipped with an enclosed operator's cab in which the operator is seated to control the harvesting operation of the machine. Operator cabs are typically located at the front of the combine and are fixedly mounted to the frame of the combine at a predetermined height. These combines also typically include a main body portion located behind the cab. The main body portion typically includes an outer housing and a rotary threshing assembly including a rotor disposed within the housing. When installed, the rotor typically extends along the length of the combine. The rotor may be installed and removed through a front end of the housing.

There are several disadvantages associated with the fixed cab arrangement. In particular, the cab cannot be raised to facilitate the installation and removal of the rotor from the front end of the combine. Moreover, there is no way for the operator to adjust the height of the cab relative to the remainder of the combine to improve the operator's vision and comfort. Finally, there is no way to lower the height of the cab for shipping and storage.

Accordingly, it would be desirable to have an apparatus and method for installing and removing a harvesting combine rotor that overcomes the disadvantages described above.

SUMMARY OF THE INVENTION

One aspect of the invention provides an apparatus for installing and removing a harvesting combine rotor. A harvesting combine includes a frame portion and a linkage assembly operatively connected to the frame portion. A cab is operatively connected to the linkage assembly to allow the cab to be raised to allow the installation and removal of a combine rotor. The linkage assembly may preferably be rotatably connected to the frame portion. A plurality of cab support mounts may be operatively connected to the linkage assembly and the cab may be mounted on the plurality of support mounts.

Another aspect of the invention provides an apparatus for installing and removing a harvesting combine rotor. A harvesting combine includes a body and a frame portion. A linkage assembly is operatively connected to the frame portion. A cab is spaced-apart from the body and is operatively connected to a linkage assembly to allow the cab to be raised to allow the installation and removal of a combine rotor. The rotor may preferably be installed and removed through a front end portion of the body. The combine may further include a housing having a front wall and the rotor may include a front end and a back end. The front end of the rotor may preferably be located adjacent the front wall of a housing and the rear end of the rotor may preferably extend upward from the front end.

Another aspect of the invention provides an apparatus for installing and removing a rotor from a harvesting combine. A harvesting combine includes a housing and a frame portion. A linkage assembly is operatively connected to the frame portion and a rotor is disposed within the housing. A cab is operatively connected to the linkage assembly to allow the cab to be raised to allow the removal of the rotor from the combine.

Another aspect of the invention provides a method of installing a rotor in a harvesting combine. A harvesting combine including a housing and a frame portion is provided. A linkage assembly is operatively connected to the frame portion. A cab is spaced-apart from the housing and is operatively connected to a linkage assembly. The cab is raised to an up position and the rotor is installed in the housing. The rotor may preferably be installed underneath the cab.

Another aspect of the invention provides a method of removing a rotor from a harvesting combine. A harvesting combine including a housing and a frame portion is provided. A linkage assembly is operatively connected to the frame portion and a rotor is disposed within the housing. A cab is operatively connected to the linkage assembly. The cab is raised to the up position and the rotor is removed from the housing. The rotor may preferably be removed underneath the cab.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
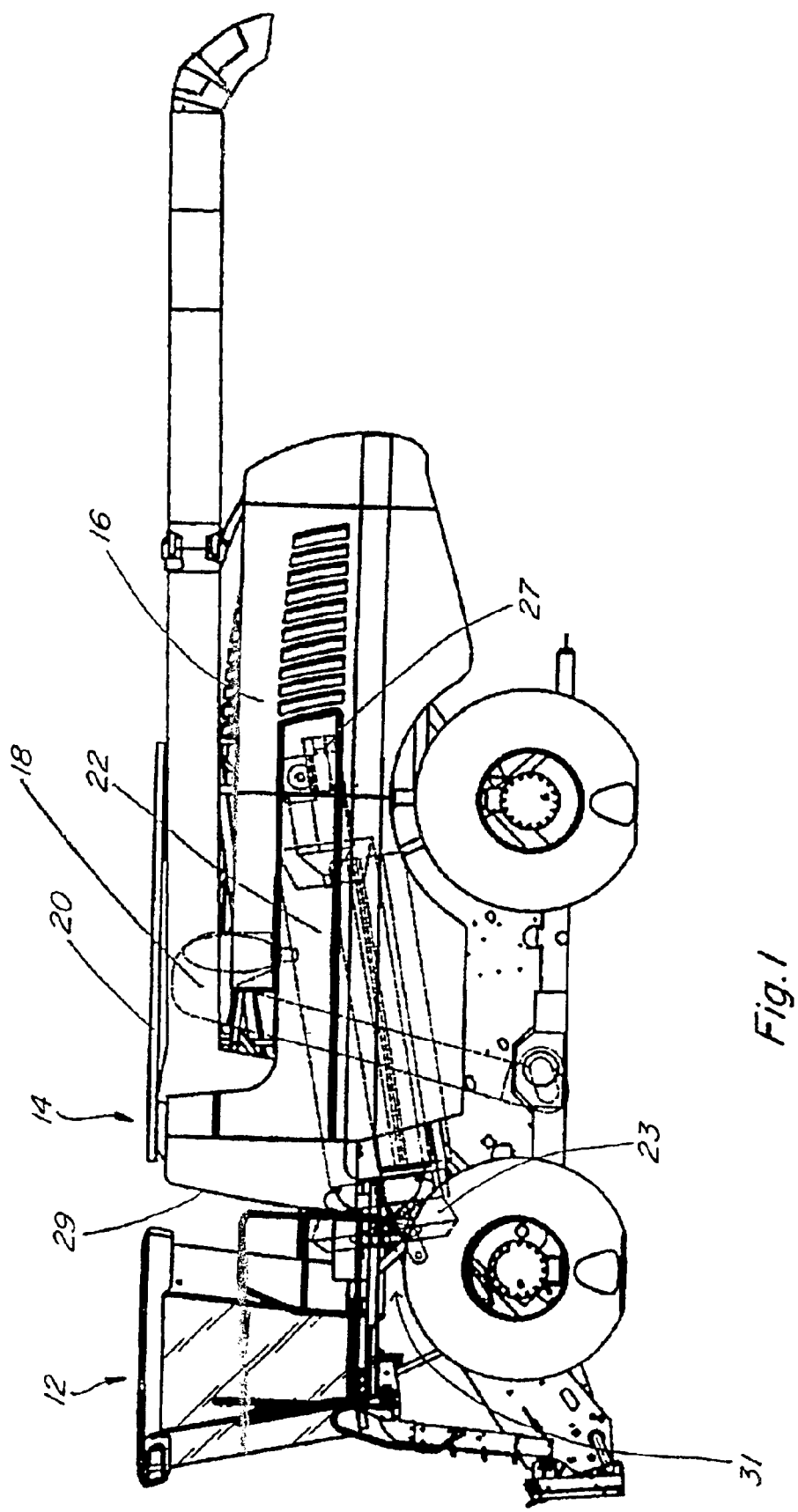
FIG. 1 is a side view of a preferred embodiment of a cab arrangement for a harvesting combine, which is made in accordance with the invention.

Referring to the drawings, and particularly to FIG. 1, a preferred embodiment of a cab arrangement for a selfpropelled harvesting combine 10 is provided. The combine 10 is capable of harvesting crops such as, for example, corn, soybeans, and wheat. In the embodiment shown, the combine 10 includes an operator cab 12 and a body 14. The body 14 may preferably include a housing 16 and various operating equipment such as, for example, a loop elevator assembly 18, a grain tank 20, a rotary threshing assembly including a rotor 22, and a cleaning system including a chaffer sieve and a shoe sieve (not shown). The chaffer sieve and the shoe sieve are preferably located below the rotor 22. The rotor 22 preferably includes a front end 23 and a back end 27. The front end 23 of the rotor 22 is located adjacent a front wall 29 of the housing 16 and the back end 27 extends upward from the front end 23 of the rotor 22. As shown in FIG. 1, the body 14 of the combine 10 is generally located behind the cab 12.

Referring to FIGS. 2–5, the cab 12 may preferably include a first side wall 26 (see FIG. 2) and a second side wall 28 (see FIG. 3) opposite the first side wall 26. The first side wall 26 of the cab 12 may preferably include a first transparent panel 30 and the second side wall 28 may preferably include a second transparent panel 32. The first and second transparent panels 30, 32 each may be comprised of glass. The cab 12 may also include a front curved transparent panel 34. The front curved transparent panel 34 may also preferably be comprised of glass.

Figure 2:
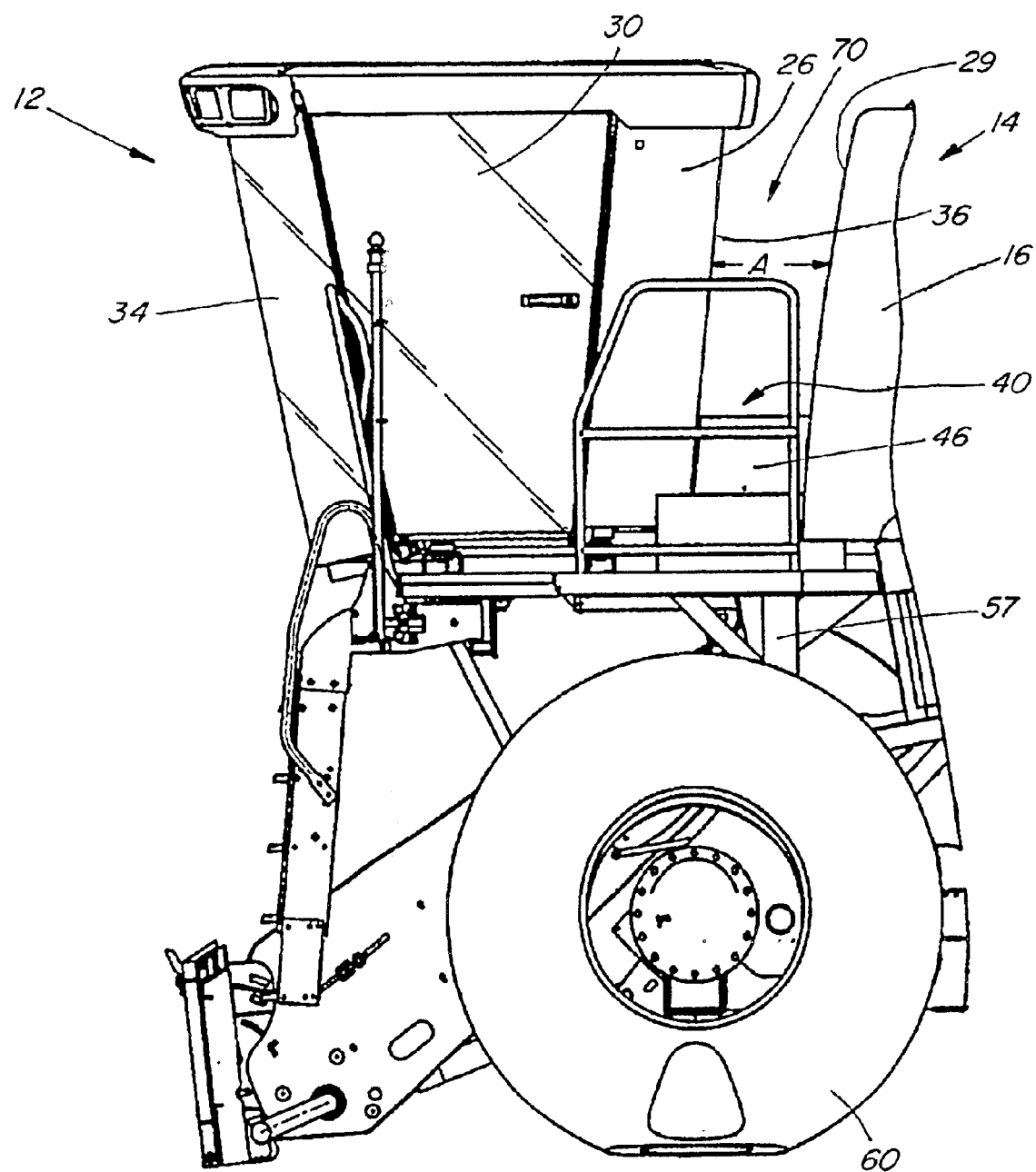
FIG. 2 is an enlarged partial side view of the embodiment of FIG. 1 showing the cab in the down position.
Figure 3:
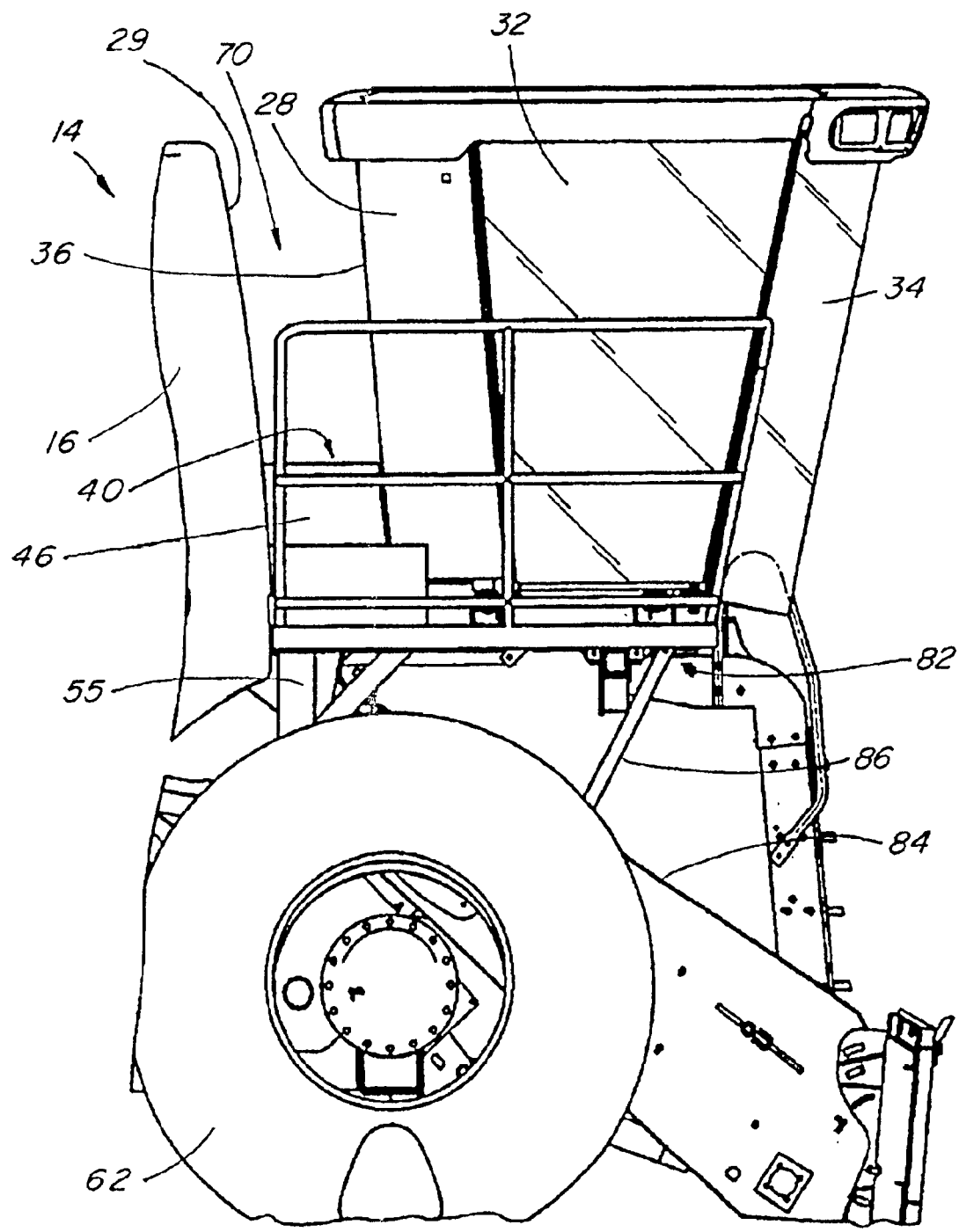
FIG. 3 is an enlarged partial side view of the embodiment of FIG. 1 showing the right side of the cab.
Figure 4:
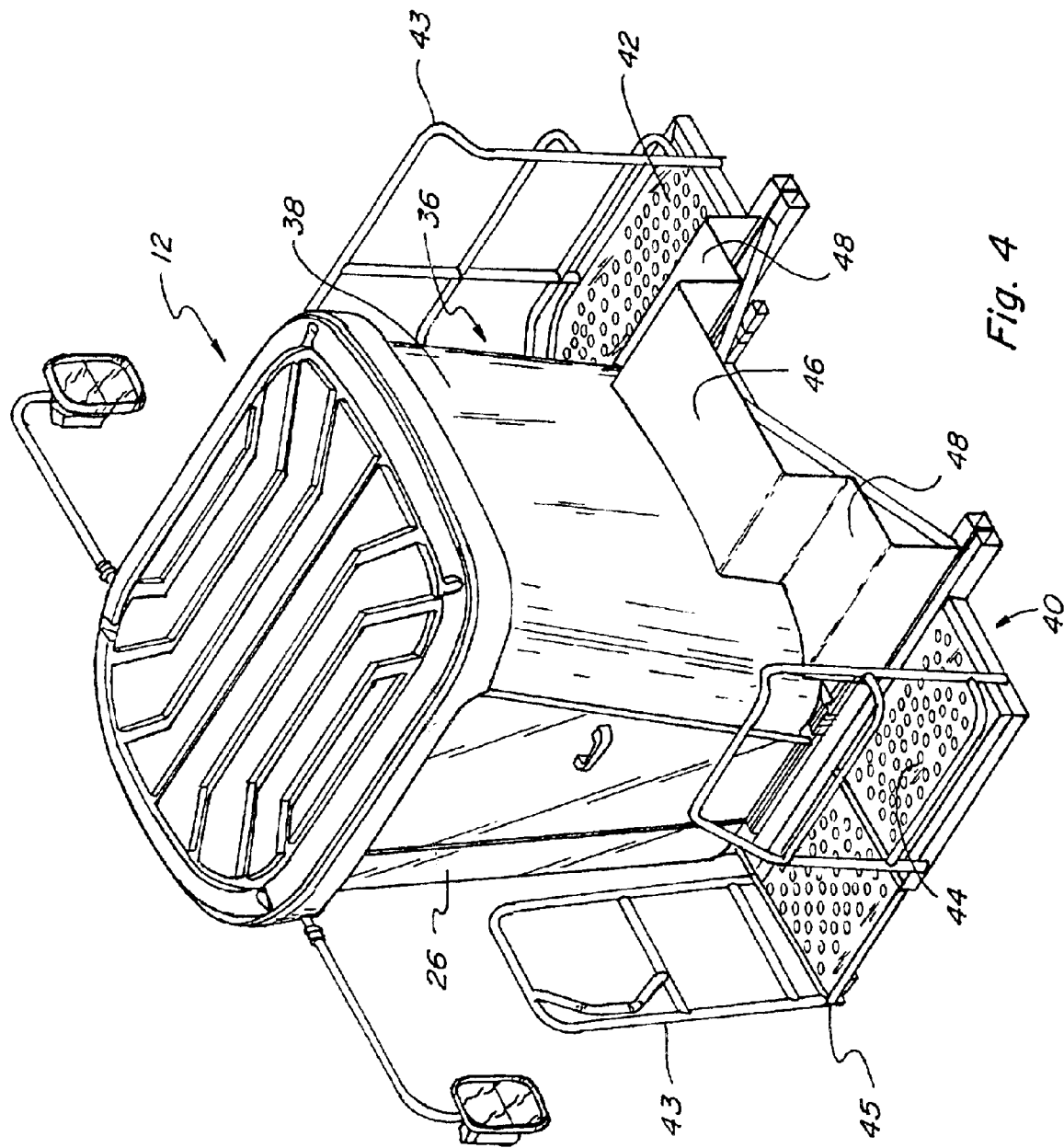
FIG. 4 is an enlarged partial perspective view of the embodiment of FIG. 1 showing the back wall of the cab.
Figure 5:
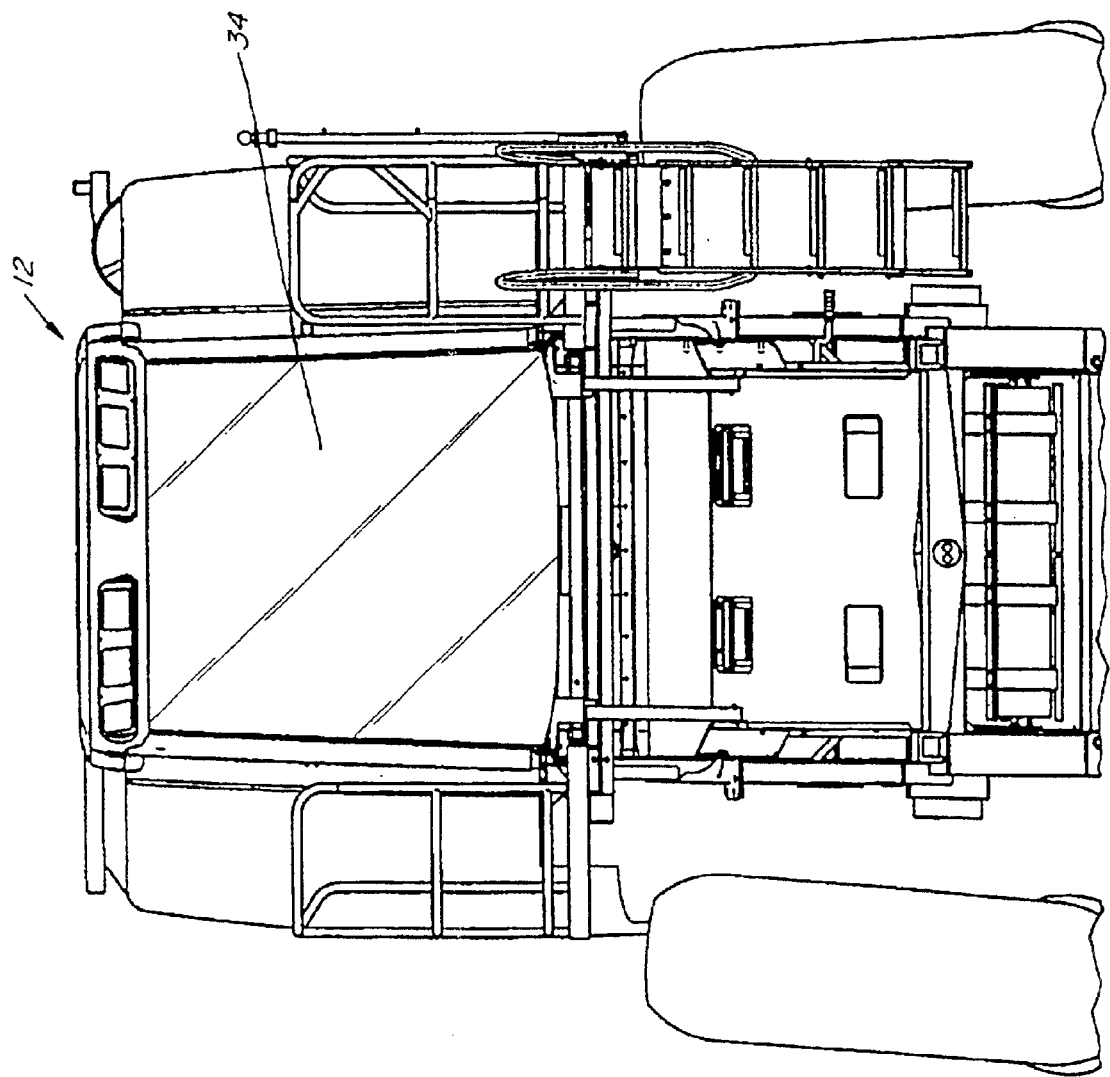
FIG. 5 is an enlarged front view of the embodiment of FIG. 1.

As shown in FIGS. 1–3, the cab 12 is spaced-apart from the body 14 of the combine 10. As shown in FIG. 4, the cab 12 includes a back wall 36 that preferably includes a transparent window 38 that provides an operator seated in the cab 12 with enhanced visibility behind the cab 12. In the embodiment shown, the transparent window 38, together with the first and second transparent panels 30, 32 and the front curved transparent panel 34, provides substantially 360-degree visibility from the cab 12. The transparent window 38 may preferably be comprised of glass. One advantage of the spaced location of the cab 12 relative to the body 14 is that it provides ample distance between the cab 12 and the body 14 to provide an operator with enhanced visibility through the transparent window 38 of both the field and the various operating equipment located behind the cab 12. Also, the spaced location of the cab 12 relative to the body portion 14 of the combine 10 provides improved aesthetics for the combine 10.

Figure 6:
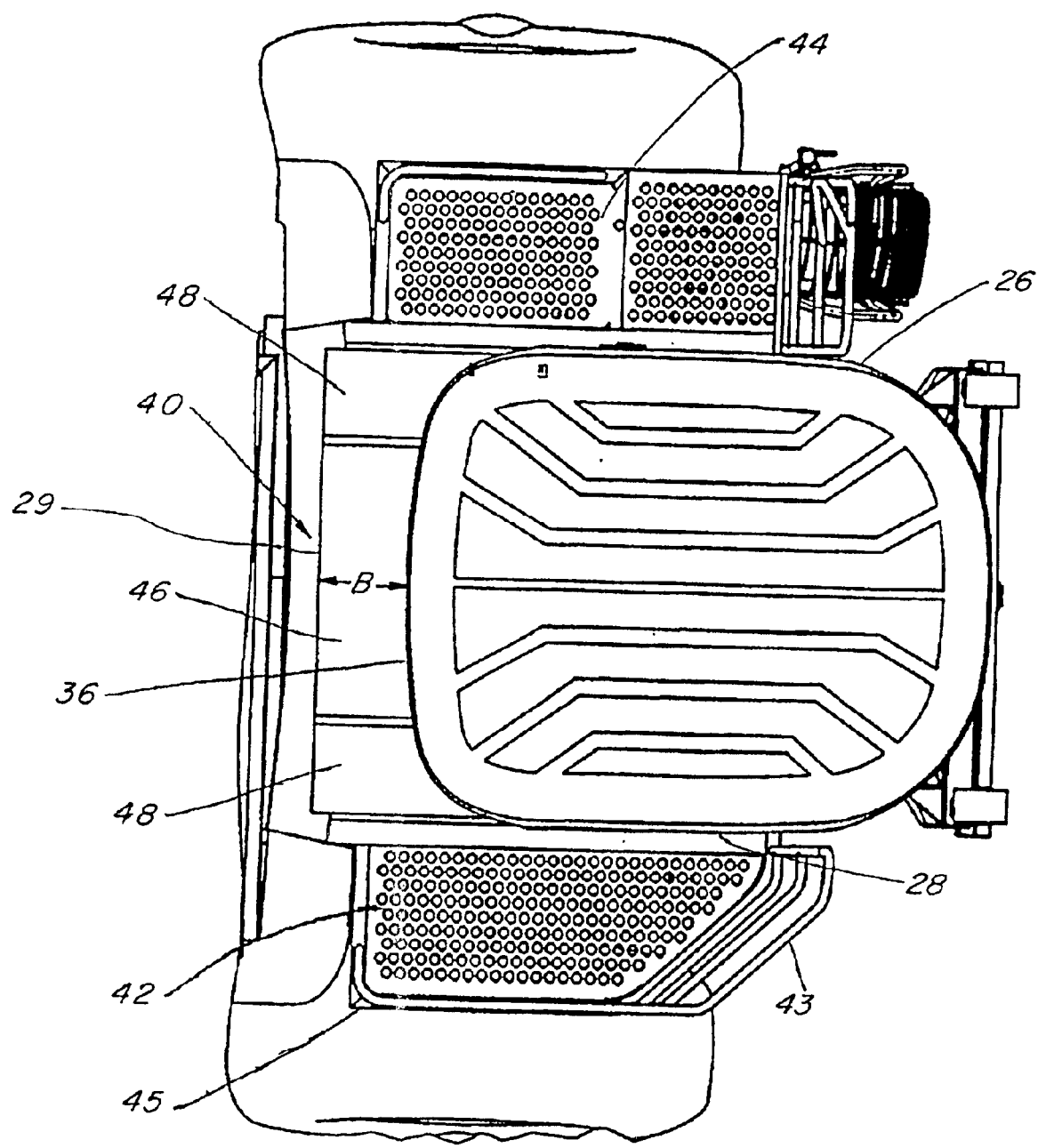
FIG. 6 is a top view of the embodiment of FIG. 3.

Another advantage of the spaced location of the cab 12 relative to the body portion 14 of the combine 10 is that it allows a platform 40 (see FIGS. 2–4 and 6) to be positioned between the cab 12 and the body 14. In the embodiment shown in FIGS. 2–4 and 6, the platform 40 extends substantially around the back wall 36 and first and second side walls 26, 28 of the cab 12. The platform 40 may be comprised of a single structure or may be comprised of various sections depending upon the particular application. In addition, the shape and configuration of the platform 40 may vary depending upon the particular application. In the embodiment shown in FIGS. 4 and 6, for example, the platform 40 includes a first side portion 42, a second side portion 44, and a back portion 46. The first and second side portions 42, 44 of the platform 40 may each preferably include a guard railing 43 extending upward from the first and second side portions 42, 44 along a portion of an outer perimeter 45 of the first and second side portions 42, 44. In the embodiment shown, the back portion 46 of the platform 40 includes a pair of step portions 48 located at opposite ends of the back portion 46. The platform 40 may be mounted to the frame of the combine 10 or any of the various support structures of combine 10. For example, in the embodiment shown in FIG. 7, the first side portion 42 of the platform 40 is mounted to and supported by a first horizontally oriented support member 50. Similarly, the second side portion 44 of the platform 40 is mounted to and supported by a second horizontally oriented support member 52. In the embodiment shown, the first support member 50 is substantially parallel to the second support member 52.

Figure 7:
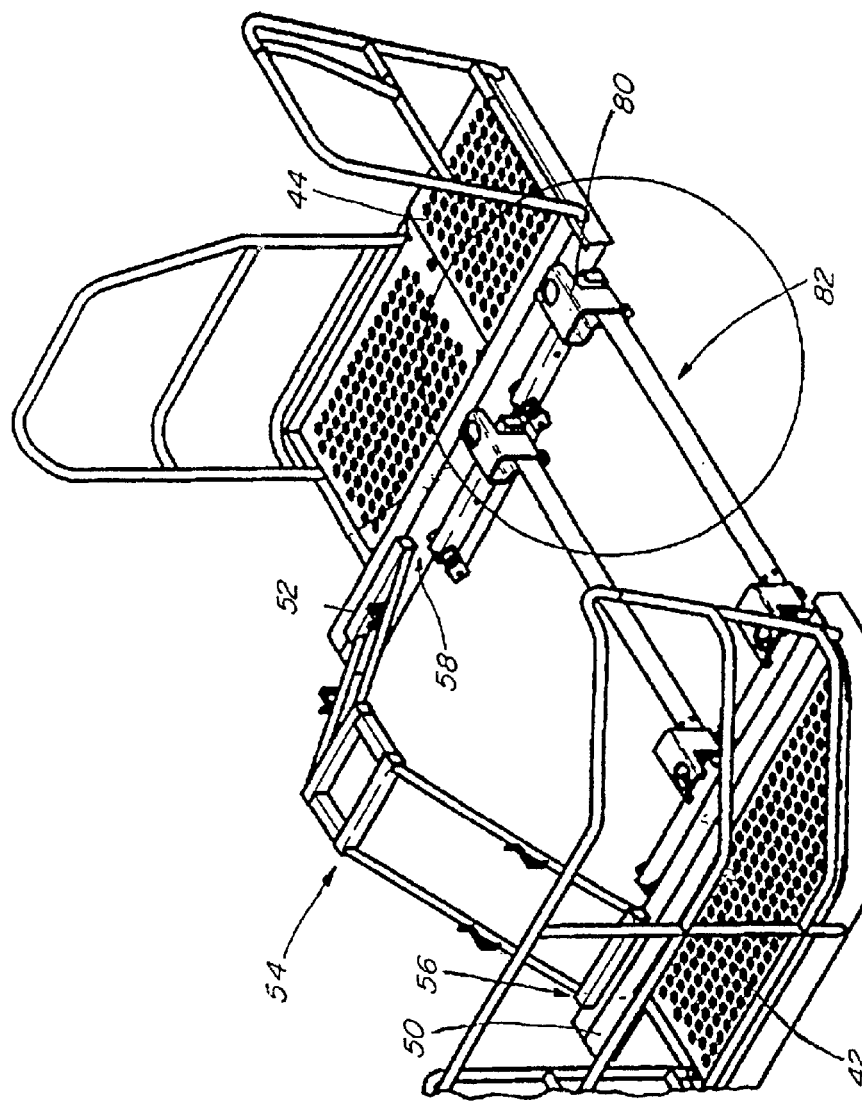
FIG. 7 is a perspective view of a preferred embodiment of the platform with the back portion removed and the linkage assembly shown in the down position.
Figure 8:
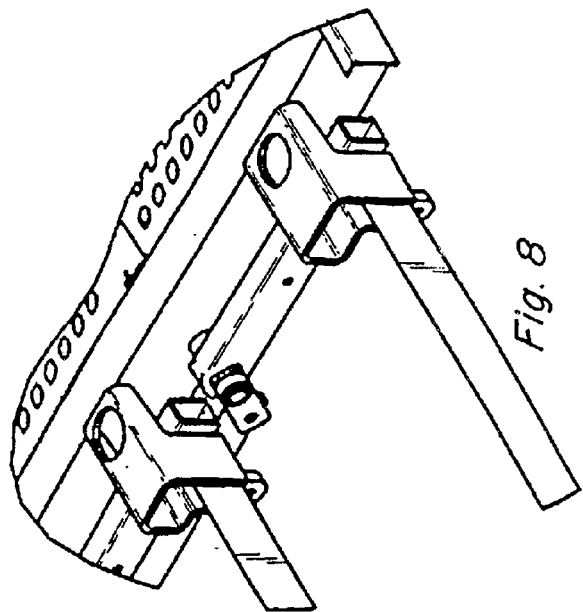
FIG. 8 is an enlarged view of the circled region of FIG. 7.

Referring to FIG. 7, a bridge member 54 has a first end portion 56 connected to the first support member 50 and a second end portion 58 connected to the second support member 52. The back portion 46 of the platform 40 may preferably be releasably attached to the bridge member 54. The first support member 50 is attached to a first vertical frame portion 55 (see FIG. 3) of the combine 10 and the second support member 52 is attached to a second vertical frame portion 57 (see FIG. 2) of the combine 10. The first and second support members 50, 52 and the platform 40 may preferably extend above the two front wheels 60, 62 of the combine 10 (see FIGS. 2–3).

Referring to FIGS. 2–3, the cab 12, the body 14, and the platform 40 define a passageway 70. In the embodiment shown, the passageway 70 is formed between the back wall 36 of the-cab 12, the back portion 46 of the platform 40, and a front wall 29 of the housing 16. The width of the passageway 70, as defined by the distance (designated as A in FIG. 2) between the back wall 36 of the cab 12 and the front wall 29 of the housing 16, may preferably be approximately 18–20 inches. The back portion 46 of the platform 40 is positioned between the back wall 36 of the cab 12 and the front wall 29 of the housing 16 and may preferably have a width (designated as B in FIG. 6) of approximately 18–20 inches. Accordingly, the platform 40 and the passageway 70 allow an operator to walk along the platform 40 through the passageway 70 directly behind the cab 12 to visually monitor and access the various operating equipment of the combine 10 from the platform 40.

Figure 9:
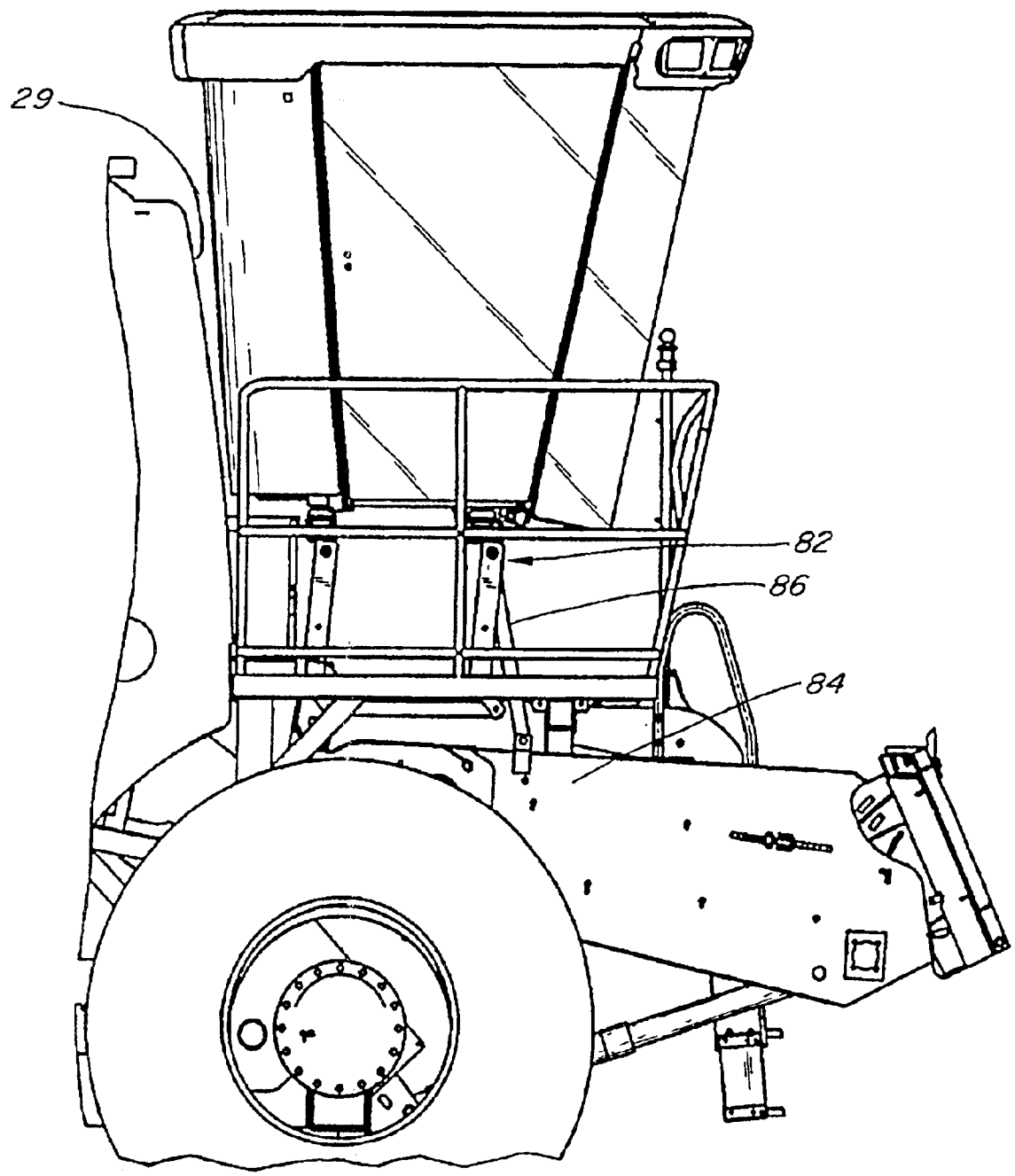
FIG. 9 is a side view of the embodiment of FIG. 3 showing the cab in the up position.
Figure 12:
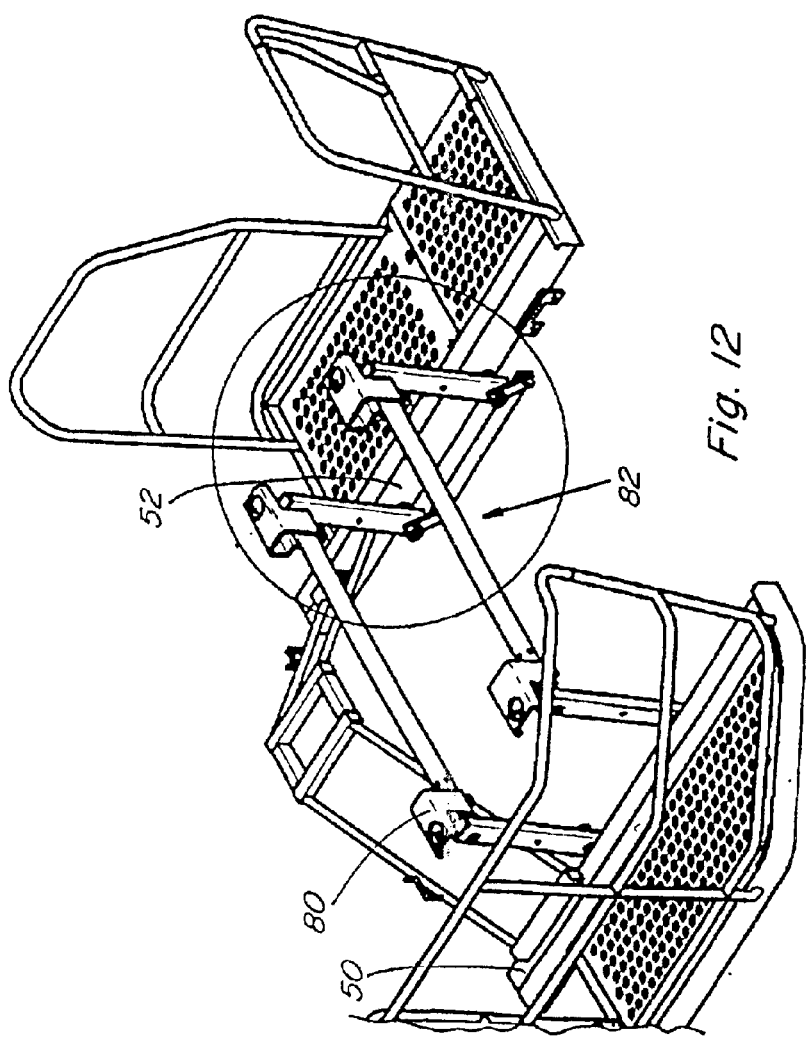
FIG. 12 is a perspective view of the embodiment of FIG. 7 showing the linkage assembly in an up position.
Figure 13:
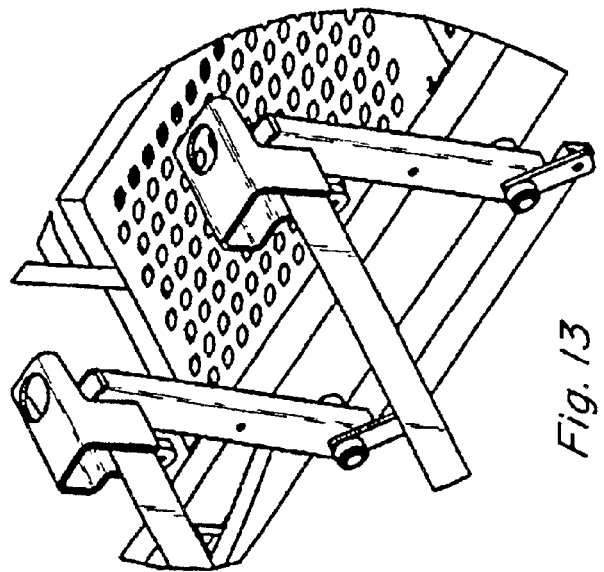
FIG. 13 is an enlarged view of the circled region of FIG. 12.

Referring to FIGS. 7 and 12, the cab 12 is mounted to a plurality of cab support mounts 80. The cab support mounts 80 are in turn connected to a linkage assembly 82. The linkage assembly 82 is rotatably connected to the first and second support members 50, 52. The linkage assembly 82 may be any conventional linkage assembly such as, for example, a four bar linkage, that allows the cab 12 to be raised and lowered. FIG. 7 shows the linkage assembly 82 in the down position and FIG. 12 shows the linkage assembly 82 in the up position. The linkage assembly 82 may also be raised or lowered by any conventional means such as, for example, a conventional hydraulic cylinder that provides hydraulic pressure. The linkage assembly 82 may also be raised and lowered with a ball screw or worm-gear drive. Alternatively, as shown in FIGS. 3 and 9, the linkage assembly 82 may be coupled to the feeder housing 84 of the combine 10 with a removable support rod 86. In this manner, the up and down movement of the feeder housing 84 may be used to raise or lower the linkage assembly 82. There are several advantages associated with being able to raise and lower the cab 12. In particular, an operator can adjust the height of the cab 12 relative to the remainder of the combine 10 to improve the operator's comfort and vision. Moreover, the cab 12 can be lowered to the down position for shipping and storage of the combine 10. Finally, the linkage assembly 82 provides a means to raise the cab 12 to facilitate the installation and removal of the rotor 22 underneath the cab 12 through a front end portion 31 of the body 14 (see FIG. 1).

To install the rotor 22 through the front portion 31 of the body 14 the cab 12 is raised to the up position (see FIGS.

Figure 11:
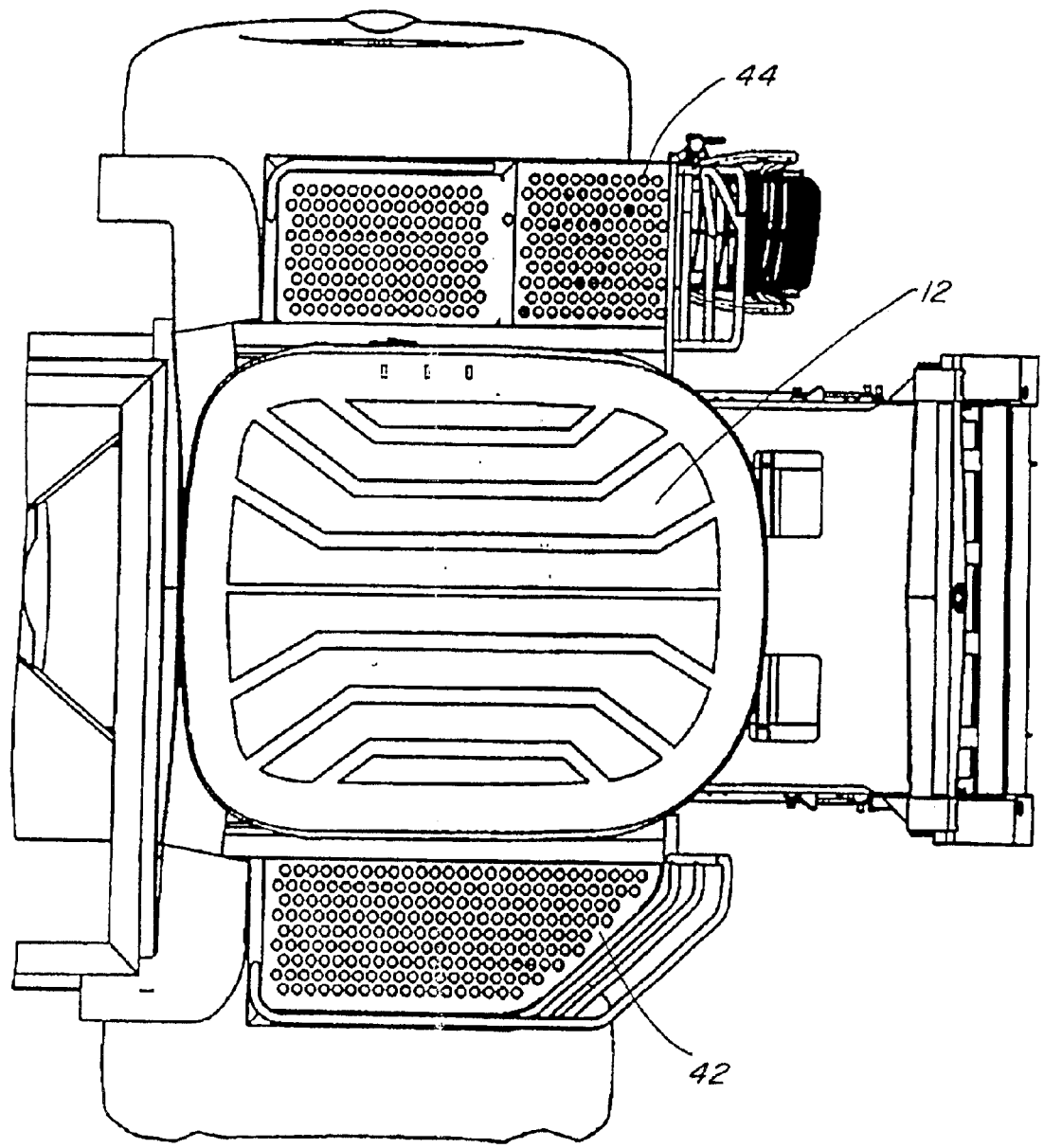
FIG. 11 is a top view of the embodiment of FIG. 9.

9–11). As shown in FIGS. 9 and 11, when the cab 12 is being raised, the rotational movement of the linkage assembly 82 causes the cab 12 to move in a backward direction toward the front wall 29 of the housing 16. As a result, the back portion 46 of the platform 40 may preferably be removed from the bridge member 54 so that the back portion 46 does not interfere with the movement of the cab 12. When the cab 12 is in the up position, the rotor 22 is installed through the front end portion 31 of the body 14 underneath the cab 12. When the rotor 22 is installed, the cab 12 may then be lowered to the desired operating height. The back portion 46 of the platform 40 may then be reattached to the bridge member 54.

Figure 10:
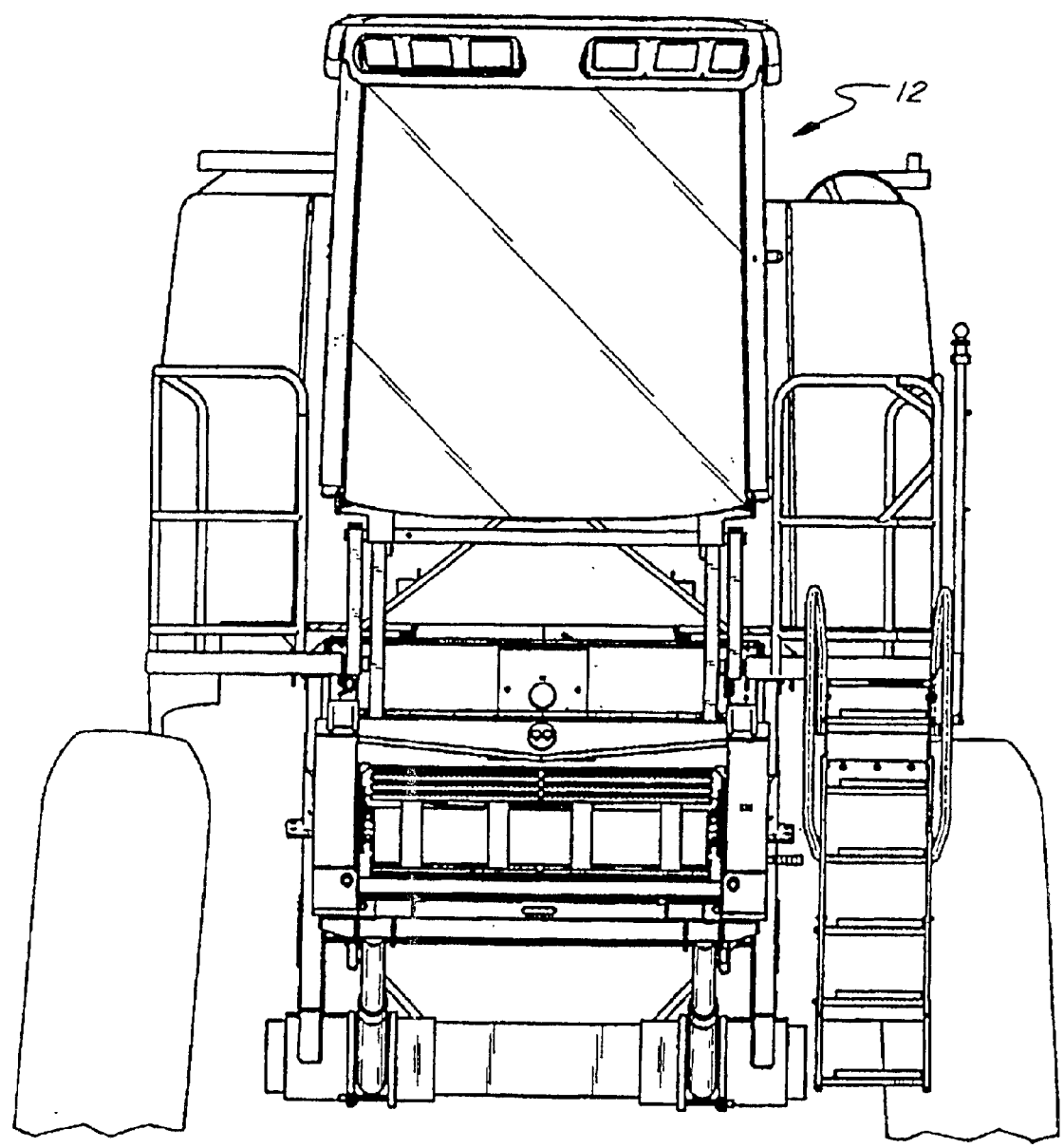
FIG. 10 is a front view of the embodiment of FIG. 5 showing the cab in the up position.

To remove the rotor 22 through the front end portion 31 of the housing 16, the cab 12 is raised to the up position (see FIGS. 9–11). Again, the back portion 46 of the platform 40 may preferably be removed so that it does not interfere with the movement of the cab 12. When the cab 12 is in the up position, the rotor 22 is removed through the front end portion 31 of the body 14 underneath the cab 12.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An apparatus for installing and removing a harvesting combine rotor comprising:
    a harvesting combine including a frame portion having a front end, the frame portion supporting a threshing rotor contained in a body located rearwardly of the front end, a cab supported at a first position on the front end forwardly of the body containing the rotor and directly forwardly of front end of the rotor, and a linkage assembly located and operatively connected to the frame portion and to the cab beneath the cab so as to be movable beneath the cab for raising the cab relative to the frame portion from the first position to a second position above the front end of the rotor, the linkage assembly, the cab and the frame portion defining a rotor spacing beneath the cab when in the second position, the rotor spacing allowing installation and removal of the rotor in the body of the harvesting combine therethrough, the harvesting combine being fully operational with the cab in both the first position and the second position.

2. The apparatus of claim 1 wherein the front end of the frame portion comprises a pair of elements extending forwardly in spaced apart relation one to the other beneath opposite lower side edges of the cab, respectively, the linkage assembly comprises a plurality of link members disposed entirely beneath the opposite side of the cab and rotatably connected to the elements of the frame portion, respectively, so as to be movable relative thereto from a down position generally parallel thereto to an up position angularly related thereto for raising the cab to the second position.

3. The apparatus of claim 1 wherein the combine further includes a feeder housing located below the cab and movable upwardly and downwardly, and a support rod for coupling the linkage assembly to the feeder housing for raising and lowering the linkage assembly by the upward and downward movement of the feeder housing.

4. An apparatus for installing and removing a harvesting combine rotor comprising:
    a harvesting combine including a body supported on a frame portion, a combine rotor located in the body, the frame portion including a front end disposed forwardly of the body, a cab disposed at a first position above the front end forwardly of the body and directly in front of a front end of the combine rotor, the body being adapted for receiving the combine rotor through a front end thereof, a linkage assembly disposed and operatively connected to the frame portion and to the cab beneath the cab and operatively movable while remaining beneath the cab for raising the cab from the first position to a second position above the first position and above the front end of the rotor, the cab in the second position allowing the installation and removal of the rotor through the front end of the body underneath the cab, the harvesting combine being fully operational with the cab in both the first position and the second position.

5. The apparatus of claim 4 wherein the linkage assembly comprises a plurality of link members disposed beneath opposite side edge portions of the cab, each of the link members having a first end pivotally connected to the frame portion and an opposite second end supporting the cab, the second ends of the link members being pivotable upwardly about the first ends thereof while remaining beneath the side edge portions of the cab for raising the cab above the front end for allowing installation and removal of the rotor.

6. The apparatus of claim 4 wherein the linkage assembly comprises a four bar linkage.

7. A method of installing a rotor in a harvesting combine comprising:
    providing a harvesting combine including a housing having a front end region through which a rotor can be installed in the housing and a frame portion having a front end including a pair of members extending forwardly adjacent to opposite sides of the front end region, a cab disposed above the pair of members when in a down position in front of the housing, and a linkage assembly disposed beneath the cab including link members adjacent to the opposite sides of the front end region connected between the pair of members and the cab and movable while remaining beneath the cab for raising the cab;
    moving the linkage assembly for raising the cab to an up position above the down position sufficiently to allow passage of a rotor beneath the cab and into the front end region of the housing; and
    installing a rotor in the housing by passage underneath the cab when in the up position, the harvesting combine being fully operational with the cab in both the down position and the up position.

8. The method of claim 7 wherein the linkage assembly comprises a four bar linkage.

9. A method of removing a rotor from a harvesting combine comprising:
    providing a harvesting combine including a housing having a front end and a frame portion having a front end extending forwardly of the front end of the housing, a rotor disposed within the housing and removable therefrom through the front end thereof, a cab disposed at a down position on the front end of the frame in front of the rotor and operatively connected to the front end of the frame by a linkage assembly disposed beneath the cab and movable while remaining beneath the cab for raising the cab to an up position above the rotor for opening a space beneath the cab and in front of the rotor;

moving the linkage assembly for raising the cab to the up position above the down position; and removing the rotor from the housing by passage through the space underneath the cab when in the up position, the harvesting combine being fully operational with the cab in both the down position and the up position.

10. The method of claim 9 wherein the linkage assembly comprises a four bar linkage.

11. The apparatus of claim 1 wherein the linkage assembly comprises a four bar linkage.

* * * * *